United States Patent [19]

Kim

[11] 4,436,971

[45] Mar. 13, 1984

[54] SNAP-IN SWITCH MOUNTING STRUCTURE

[75] Inventor: Syng N. Kim, Hoffman Estates, Ill.

[73] Assignee: Wico Corporation, Niles, Ill.

[21] Appl. No.: 371,513

[22] Filed: Apr. 23, 1982

[51] Int. Cl.3 .......... H02B 5/00

[52] U.S. Cl. .......... 200/295; 200/283; 200/DIG. 46

[58] Field of Search .......... 200/295, 296, 159 A, 200/153 L, 153 LA, 283, 6 A, DIG. 46, 153 K, 293; 74/471 XY; 361/426

[56] References Cited

U.S. PATENT DOCUMENTS

| | | | |
|---|---|---|---|
| 2,856,492 | 10/1958 | Heyhal | 200/284 |
| 2,885,517 | 5/1959 | Carmichael et al. | 200/295 X |
| 2,956,139 | 10/1960 | Paddock | 200/283 X |
| 3,085,139 | 4/1963 | Wright | 200/292 |
| 3,223,792 | 12/1965 | Strother, Jr. | 200/6 A |
| 3,244,941 | 4/1966 | Maynard et al. | 200/295 X |
| 3,681,552 | 8/1972 | Bailey | 200/295 |
| 3,749,873 | 7/1973 | Harper et al. | 200/293 |
| 3,790,733 | 2/1974 | Pohl | 200/283 |
| 3,974,352 | 8/1976 | Pite et al. | 200/293 |
| 4,016,387 | 4/1977 | Aberer | 200/303 |
| 4,032,739 | 5/1977 | Nicolaisen et al. | 200/283 |
| 4,055,734 | 10/1977 | Hayden | 200/159 A X |
| 4,070,559 | 1/1978 | Pibier | 200/296 |
| 4,105,883 | 8/1978 | Hastings et al. | 200/296 |
| 4,181,827 | 1/1980 | Diepeveen | 200/6 A |
| 4,348,556 | 9/1982 | Gettig | 200/6 A X |

FOREIGN PATENT DOCUMENTS

| | | | |
|---|---|---|---|
| 1145689 | 3/1963 | Fed. Rep. of Germany | 200/159 A |
| 543364 | 7/1965 | Fed. Rep. of Germany | 200/159 A |
| 1239385 | 4/1967 | Fed. Rep. of Germany | 200/283 |

*Primary Examiner*—Stephen Marcus
*Assistant Examiner*—Ernest G. Cusick
*Attorney, Agent, or Firm*—Dithmar, Stotland, Stratman & Levy

[57] ABSTRACT

The mounting structure includes a pair of side abutments, upper and lower abutments, and front and rear abutments into which a rectangular parallelepiped body of a leaf spring switch is snap fit.

13 Claims, 8 Drawing Figures

SNAP-IN SWITCH MOUNTING STRUCTURE

BACKGROUND OF THE INVENTION

Leaf spring switches include a plastic body carrying two or more leaf springs. In the past, they have been mounted by attaching them to expensive metal brackets which are in turn attached to the device in which they are used, requiring four screws in all. This is undesirably expensive and time consuming to assemble. These difficulties are multiplied when a device requires several such switches. For example, in a joystick unit, at least four leaf spring switches are required.

SUMMARY OF THE INVENTION

It is therefore an important object of the invention to provide structure for rapidly and inexpensively mounting leaf spring switches.

A further object is to provide such a mounting structure in which the leaf spring switches are snapped into place without the use of fasteners or tools.

Another object is to provide such a mounting structure in which the leaf spring switch is securely mounted, yet is readily attached.

In summary, there is provided structure for mounting a leaf spring switch having a body which carries at least two leaf springs, said mounting structure comprising two side abutments spaced apart a distance about equal to the width of the body, upper and lower abutments spaced apart a distance about equal to the height of the body, and front and rear abutments spaced apart a distance about equal to the length of the body.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings, a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 2:
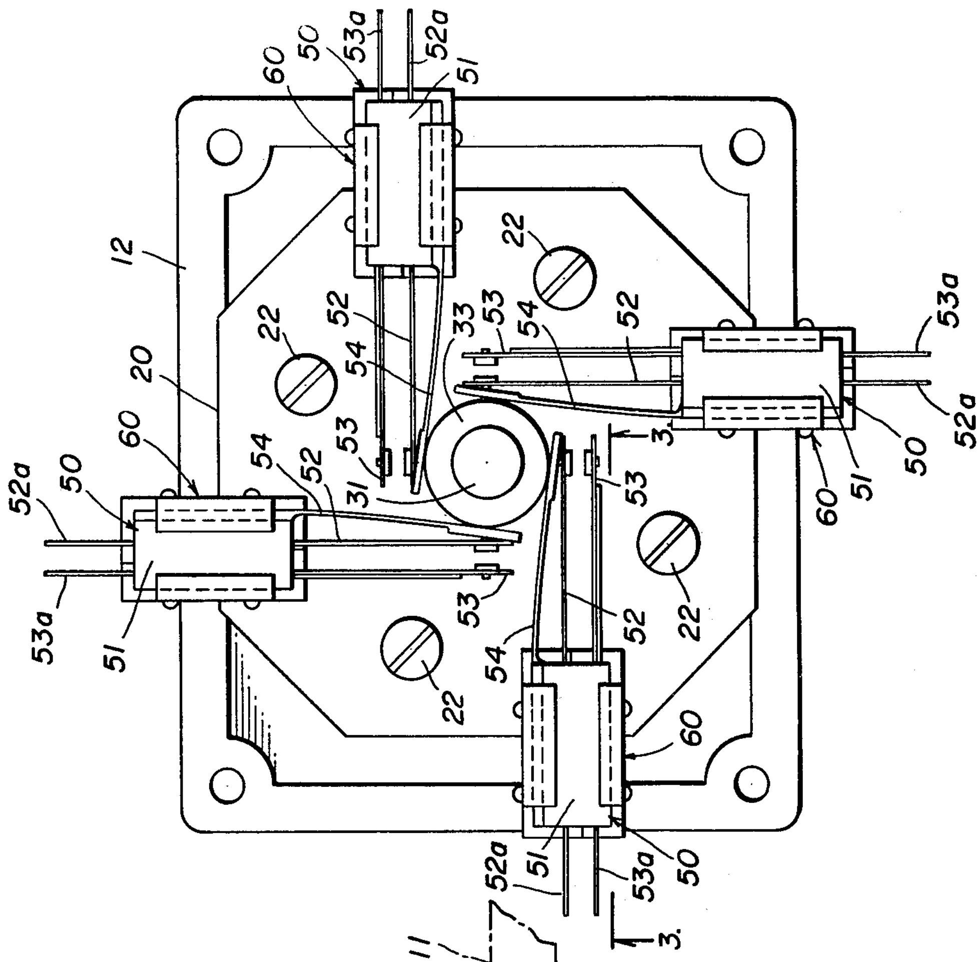
FIG. 2 is a bottom plan view of the joystick unit of FIG. 1.
Figure 1:
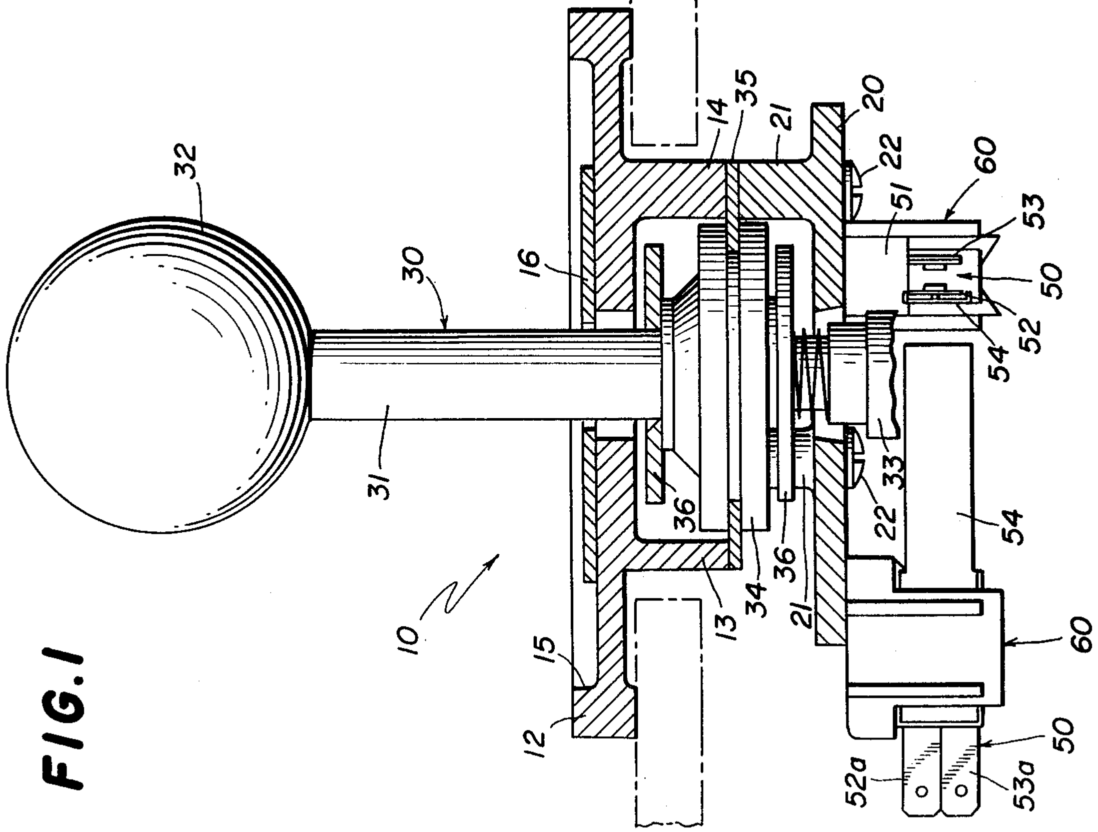
FIG. 1 is a view in vertical section of a joystick comprising leaf spring switch mounting structure incorporating the features of the present invention.

Referring now to FIGS. 1 and 2 of the drawings, there is illustrated a joystick unit 10, including mounting structure constructed in accordance with the features of the present invention. The joystick unit 10 is adapted to be mounted to a wall panel 11 of an associated device such as an electronic game. The joystick unit 10 includes a generally flat, rectangular top plate 12. Integral with the top plate 12 and depending centrally therefrom is a generally cylindrical wall 13 having four enlarged, equiangularly spaced portions 14 (only one is shown). A recess 15 in the upper surface of the top plate 12 accommodates a washer 16.

The joystick unit 10 also includes an octagonal, plastic mounting plate 20 having four cylindrical bosses 21 extending upwardly therefrom (only two are shown). The bosses 21 are equiangularly spaced and are respectively vertically aligned with the enlarged portions 14. Screws 22 extend through the bosses 21 and the enlarged portions 14 to attach the mounting plate 20 to the top plate 12.

The joystick unit 10 further includes an actuator 30 having a shaft 31 carrying a handle 32 at one end thereof and a contact member 33 at the other end thereof. The actuator 30 is mounted by means of a rubber pivot diaphragm 34 which is molded onto a square metal plate 35. There are holes (not shown) respectively near the corners of the plate 35. The plate 35 is located between the enlarged portions 14 and the bosses 21, the screws 22 extending through such holes, thereby to attach the actuator 30. The actuator 30 is thus pivotal about the diaphragm 34 in order to move the contact member 33 as desired.

On the underside of the switch mounting plate 20 and integral therewith are four one-piece plastic clips 60 located on every other edge of the eight-sided plate and at one end of each such edge. Each clip 60 carries a leaf spring switch 50. Each leaf spring switch 50 includes a plastic body 51 in the form of a rectangular parallelepiped into which are molded two leaf springs 52 and 53. The leaf spring 52 is adapted to be moved toward the leaf spring 53 to close the switch 50 and to be moved away to open the switch. One end of the leaf spring 52 is a tab portion **52*a* to which electrical connection may be made. Likewise the leaf spring 53 has a tab portion 53*a*. Finally, the leaf spring switch 50 includes a plastic guard 54 in the form of a strip which is located adjacent to the leaf spring 52**.

In operation, the pivot diaphragm 34 accommodates pivotal movement of the shaft 31. Movement of the handle 32 to the right (as viewed in FIG. 2) will cause the contact member 33 to move to the left into engagement with the guard 54 on the lower switch 50 and deflect it sufficiently to move its associated leaf spring 52 into contact with its associated leaf spring 53.

Moving the handle to the right will cause contact member 33 to move to the left and close the switch 50 at the top. Movement of the handle downwardly will cause the switch 50 at the right to close while movement upwardly will cause the switch 50 at the left to close. Movement of the handle in the 45° direction will cause the left and top switches 50 to close. Movement of the handle in the 135° direction will cause the left and lower switches 50 to close.

Referring now to FIGS. 3–6, details of the switch mounting structure will be described. The clips 60 are of unitary, one-piece construction and also are integral with the mounting plate 20. Each clip 60 includes a pair of side walls 61 spaced apart a distance about equal to the width of the body 51 so that the body 51 can be snugly located therebetween. Each such wall carries a pair of vertically extending rigidifying ribs 62 to insure that the walls 61 retain their vertical orientation though they may be tilted somewhat during assembly. The side walls 61 constitute side abutments to retain the switch 50.

Each clip 60 includes front and rear base portions 63, the front base portion 63 being integral with the side walls 61 and the rear base portion 63 being integral with both side walls 61 and the mounting plate 20. The upper surfaces of the base portions 63 define a floor having a front section 64*a* and a separate rear section 64*b* lying in a common plane. The body 51 rests on the sections 64*a* and 64*b*.

Located on the upper end of each wall 61 is a shoulder 65 having an inwardly directed abutment surface 66. The front and rear floor sections 64*a* and 64*b* constitute a discontinuous lower abutment surface. The separate abutment surfaces 66 constitute sections of a discontinuous upper abutment. The vertical distance between the front and rear floor sections 64*a* and 64*b* and the abutment surfaces 66 is about equal to the height of the body 51 so that it can be snugly located therebetween. The front corner of each shoulder 65 is cut away at 67 for reasons to be explained hereinafter.

Located on the front floor section 64*a* is an upstanding lug 69, its rear surface defining a front abutment 70. Its front surface is inclined upwardly and rearwardly to define a guide surface 71. On the rear section 64*b* is an upstanding rear abutment 72. The distance between the front and rear abutments 70 and 72 is about equal to the length of the body 51 so that it can be snugly located therebetween. The front edge of the rear base portion 63 is cut away to form a ramp 73 that inclines upwardly and rearwardly. Its purpose will be described hereinafter.

Figure 8:
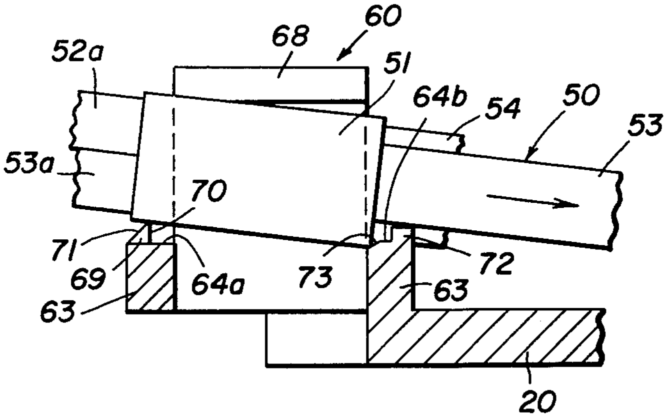
FIG. 8 depicts a subsequent position of the switch as it is being mounted.
Figure 5:
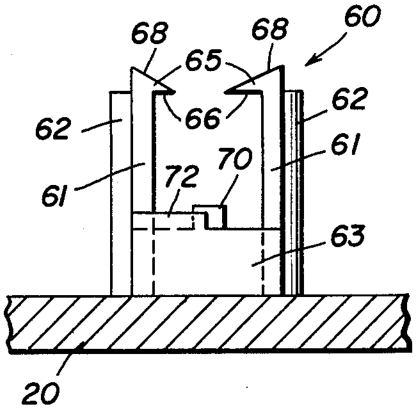
FIG. 5 is a front elevational view of a clip without the switch in place.
Figure 7:
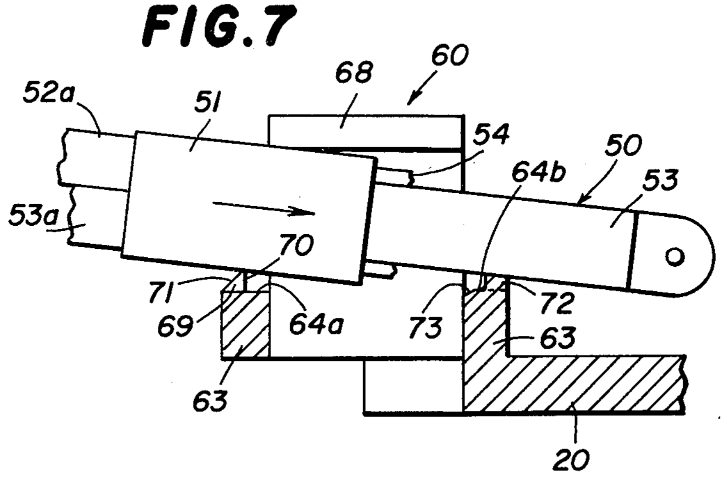
FIG. 7 is a view like FIG. 3 but with the switch only partly inserted.
Figure 6:
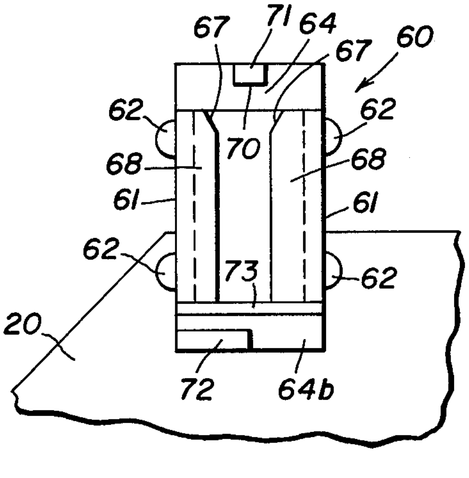
FIG. 6 is a top plan view of the clip.

In assembling a switch 50 into its associated clip 60, leaf springs 52 and 53 and the guard 54 are inserted between the side walls 61 at a slight angle of say 5° to 10°. The leaf springs 52 and 53 rest on the top of the rear abutment 72. The guide surface 71 provides some guidance to orient the front lower edge into position. The upper front edge of the body 51 will contact the shoulders 65 but because they are cut out at 67, they can be forced to pass beneath the shoulders 65. The body 51 rests on the lug 69, all as shown in FIG. 7. The switch 50 is urged rearwardly and slightly downwardly until the front lower edge of the body 51 engages the ramp 73 as depicted in FIG. 8. Further rearward movement of the switch 50 will cause the edge to ride up the ramp 73 until the lower surface of the body 51 rests on the rear floor section 64*b*. At the same time, the front portion of the body 51 will snap past the lug 69 and into place on the front floor section 64*a*. Thus, the body 51 will be located betweend the front abutment 70 and the rear abutment 72, between the sections 64*a* and 64*b* on the one hand and the abutment surfaces 66 on the other hand, and between the side walls 61, as shown in FIG. 3.

Figure 3:
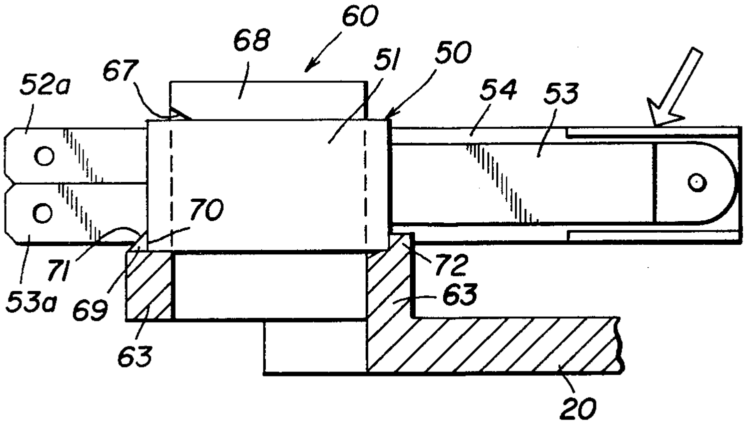
FIG. 3 is a view in vertical section of a leaf spring switch and its associated mounting clip taken along the line 3—3 of FIG. 2 but on an enlarged scale.
Figure 4:
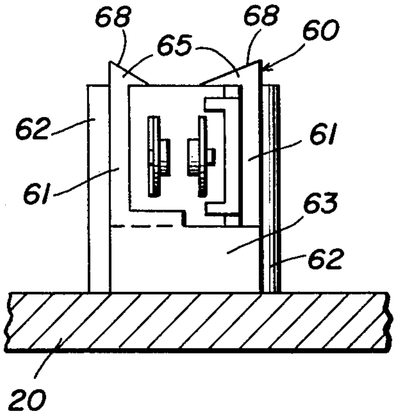
FIG. 4 is a front view of the leaf spring switch and associated mounting structure.

To remove the leaf spring switch 50 downward, pressure is exerted on the leaf springs 52 and 53 in the direction of the arrow shown in FIG. 3, causing the switch 50 to pivot about the rear lower edge of the body 51 until the front, lower edge clears the abutment 69, whereupon the switch 50 can be pulled rearwardly and slightly upwardly to remove the same.

The upper surfaces of the shoulder 65 can be inclined as shown downwardly and inwardly to provide camming surfaces 68. That is not necessary to the embodiment described but is an alternative way to mount the switch 50. In that event, one would place the switch 50 such that the body 51 rests on the camming surfaces 68 and then forceably push downwardly to deflect the side walls 61 outwardly until the top of the body 51 clears the shoulders 65, with a return to their at-rest condition.

Although the particular embodiment described above is in the context of a joystick unit, and a mounting plate with four clips 60, it is to be understood that the principles of the present invention are usable in an environment where it is desired to mount a leaf spring switch whether one such switch is needed or several.

What has been described therefore is an improved mounting structure for a leaf spring switch which does not require the use of fasteners or tools for mounting. The leaf spring switch is readily snapped into place and can even be removed if desired.

I claim:

1. Structure for mounting a leaf spring switch having a body which carries at least two leaf springs, said body having a height and a width and a length, said mounting structure comprising two side abutment walls spaced apart a distance about equal to the width of the body, upper and lower abutments spaced apart a distance about equal to the height of the body, and front and rear abutments spaced apart a distance about equal to the length of the body, said upper abutment being discontinuous and having two separate spaced-apart sections respectively carried by said side abutment walls, said lower abutment being discontinuous and having two separate spaced-apart front and rear sections lying in a common plane, said front and rear abutments being respectively carried by said front and rear sections of said lower abutment.

2. The leaf spring mounting structures of claim 1, wherein said front and rear abutments are lugs having a height short compared to the height of the body.

3. The mounting structure of claim 1, and comprising a pair of side walls respectively constituting said side abutments.

4. The mounting structure of claim 3, and further comprising at least two vertically extending ribs on and integral with each of said side walls for rigidification thereof.

5. The mounting structure of claim 3, wherein each of said side walls carries an inwardly directed shoulder having a front end and a rear end, said shoulders constituting said upper abutment sections.

6. The mounting structure of claim 5, wherein the front end of each shoulder is tapered downwardly and rearwardly to facilitate insertion of the leaf spring switch.

7. The leaf spring mounting structure of claim 5, wherein each of said shoulders has a downwardly and inwardly tapered camming surface, said leaf spring switch being mounted by placing said body on said surfaces and pushing downwardly, thereby causing said surfaces and the abutments carried thereby to spread, thereby enabling said body to be brought to a position resting on said lower abutment, said shoulders returning to their at-rest position.

8. Structure for mounting a leaf spring switch having a body which carries at least two leaf springs, said body having a height and a width and a length, said mounting structure comprising two side abutments spaced apart a distance about equal to the width of the body, upper and lower abutments spaced apart a distance about equal to the height of the body, front and rear abutments spaced apart a distance about equal to the length of the body, and an upwardly and rearwardly directed ramp in front of said rear abutment, the leaf spring switch being mounted by placing the body on top of said front abutment and beneath said upper abutment and between said side abutments, then pushing the body rearwardly until engagement with said ramp and continuing to push said body rearwardly to cause said body to ride up said ramp and onto said lower abutment.

9. The mounting structure of claim 8, wherein said lower abutment has a front section and a rear section lying in a common plane.

10. The leaf spring mounting structure of claim 8, wherein said front and rear abutments are lugs having a height short compared to the height of the body.

11. The mounting structure of claim 8, and comprising a pair of side walls respectively constituting said side abutments.

12. The mounting structure of claim 11 wherein each of said side walls carries an inwardly directed shoulder having a front end and a rear end, said shoulders constituting said upper abutment.

13. The mounting structure of claim 12, wherein the front end of each shoulder is tapered downwardly and rearwardly to facilitate insertion of the leaf spring switch.

* * * * *